No. 887,205. PATENTED MAY 12, 1908.
M. S. LOCKE.
VEGETABLE CUTTER.
APPLICATION FILED APR. 17, 1907.
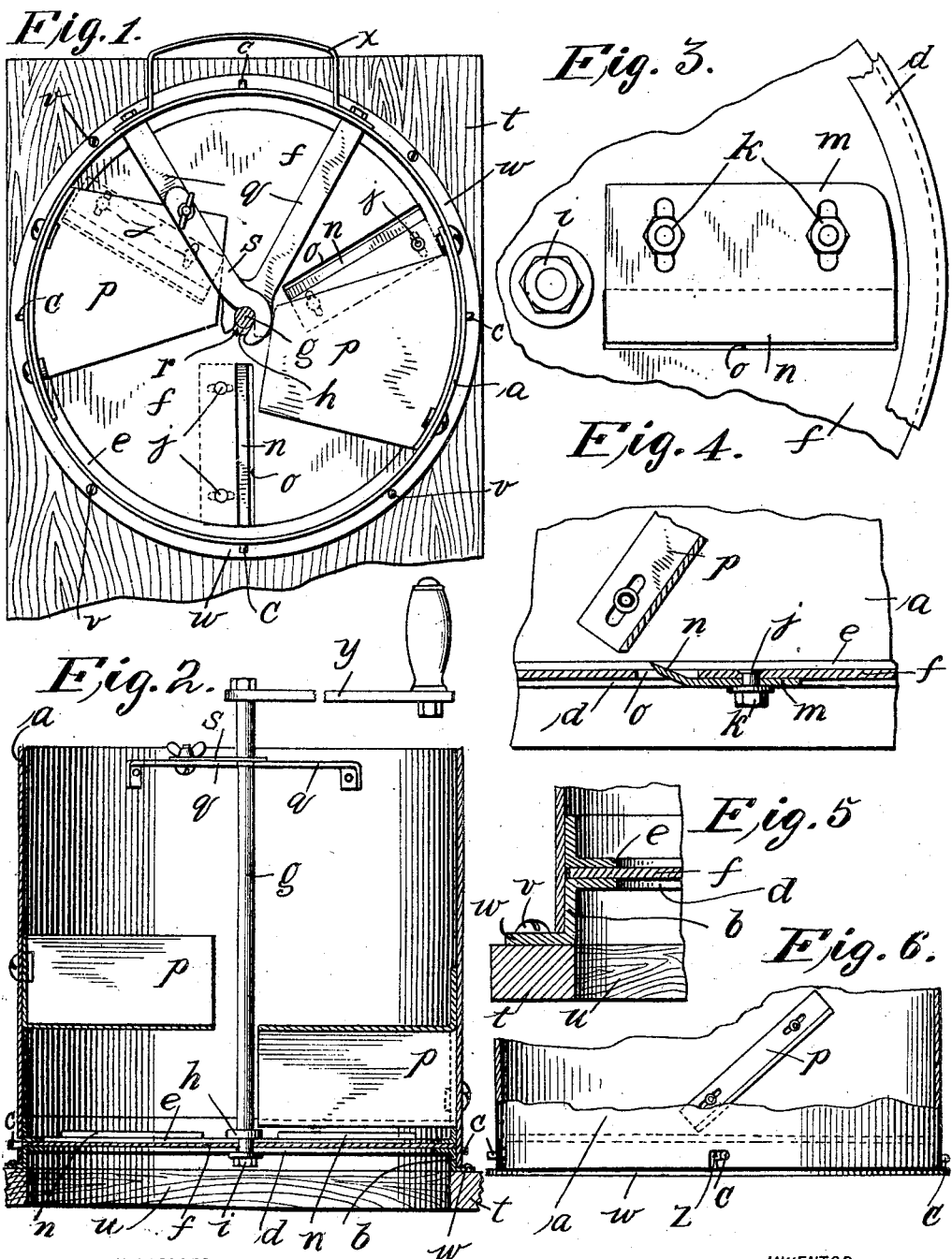

UNITED STATES PATENT OFFICE.

MILTON SHERMAN LOCKE, OF SYRACUSE, INDIANA.

VEGETABLE-CUTTER.

No. 887,205.      Specification of Letters Patent.      Patented May 12, 1908.

Application filed April 17, 1907. Serial No. 368,747.

*To all whom it may concern:*

Be it known that I, MILTON S. LOCKE, a citizen of the United States, residing at Syracuse, in the county of Kosciusko and State of Indiana, have invented certain new and useful Improvements in Vegetable-Cutters, of which the following is a specification, reference being had to the accompanying drawings.

My invention relates to improvements in devices for slicing vegetables; and an object of my invention is to provide a vegetable cutter which will prove simple in construction, and efficient in operation and which may be readily taken apart for adjustment, repair and cleaning.

In the drawings illustrating the principle of my invention and the best mode now known to me of applying that principle, Figure 1 is a plan and Fig. 2 is a central vertical section of my new cutter; Fig. 3 is a detail showing the mounting of the knife; Fig. 4 is a detail showing the relation of the lower end of the holding-plate to the knife; Fig. 5 is a detail illustrating the mounting of the cutter-disk; and Fig. 6 is a detail showing the adjustment of the casing upon the band.

The lower edge of the casing $a$ is formed with slots $z$ which are shaped like an inverted L; and the supporting band $b$ is formed with studs $c$ adapted to engage in the slots $z$ to secure together detachably the casing and the band (Figs. 2 and 6). The band $b$ is formed with an inwardly-projecting flange $d$ between which and the annulus $e$ secured to the interior wall of the casing is mounted the cutter-disk $f$ (Fig. 5). The latter is held fast upon a shaft $g$ to which it is secured between the collar $h$ and the nut $i$ (Fig. 2). To the cutter-disk $f$ are adjustably secured by bolts $j$ and nuts $k$ the cutters $m$ the knife-edges $n$ of which project up through the slots $o$ formed in the cutter-disk $f$ (Fig. 4). While three knives $m$ are shown, this number may be departed from without departure from the spirit of my invention. To the interior wall of the casing $a$ are adjustably secured the holding-plates $p$ which hold the material to be cut during the travel of the knives in slicing it.

The shaft hanger or support $q$ is V-shaped and its ends are secured to the top edge of the casing $a$ (Fig. 1), while its apex is formed with a recess $r$ in which the shaft $g$ takes a bearing. Upon the hanger $q$ is pivotally secured a locking arm $s$ the free end of which is hook-shaped (Fig. 1) and serves to hold the shaft in place in its bearing.

The device may be secured to a board $t$ formed with a hole $u$ around the edge of which is fastened by the screws $v$ the outwardly-projecting flange $w$ of the supporting band $b$ (Figs. 2 and 5). The sliced material will then fall through the slots $o$ in the cutter-disk $f$ (Fig. 4) and the hole $u$ in the board $t$ (Fig. 5).

The casing $a$ is provided with a suitable handle $x$. The upper end of the shaft is provided with a suitable crank-arm $y$; but other means of turning the shaft may be employed without departure from my invention. By turning the casing $a$ the studs $c$ may be freed from the slots $z$ and the casing removed, after releasing the shaft $g$ by throwing outwardly the arms $s$. The cutter-disk $f$ may be then removed and all the parts may be thoroughly cleaned and repaired.

I claim:

1. In a device of the character described, the combination of a supporting band formed with a flange; a casing detachably secured to said supporting band and formed with an inwardly-projecting flange; a cutter-disk mounted between said flanges; knives mounted in said cutter-disk; and means for rotating said cutter-disk.

2. In a device of the character described, the combination of a casing formed with L-shaped slots; a supporting band formed with studs adapted to engage in said slots and with an inwardly-projecting flange; a ring mounted in said casing above said flange; and a cutter-disk the edge of which is mounted free to rotate between said flange and ring.

3. In a device of the character described, the combination of a band formed with an annular inwardly-projecting flange and an outwardly-projecting flange; a casing formed with an annular flange and detachably secured to said band; and a cutter-disk the edge of which is free to rotate between said annular flanges.

4. In a device of the character described, the combination of a casing; a V-shaped shaft-support secured thereto, one arm of said support having its inner end forked and the other arm having pivoted thereto a locking-arm the inner end of which is hook-shaped; a shaft which is held in said forked end by the hook-shaped end of said locking arm; and a cutter-disk secured to said shaft.

In testimony whereof I have hereunto set my hand in the presence of the two undersigned witnesses at said Syracuse this eleventh day of April, 1907.

MILTON SHERMAN LOCKE.

Witnesses:
 ASHER L. CORNELIUS,
 DANIEL S. HONTZ.